United States Patent
Davies et al.

(10) Patent No.: US 11,034,337 B2
(45) Date of Patent: Jun. 15, 2021

(54) AIR AND FLUID CLEANING SYSTEM AND METHOD FOR CLEANING VEHICLE VISION DEVICES

(71) Applicant: KAUTEX TEXTRON GmbH & CO. KG, Bonn (DE)

(72) Inventors: Chris Davies, Cardiff (GB); Aaron Williams, Cardiff (GB)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 101 days.

(21) Appl. No.: 16/431,656

(22) Filed: Jun. 4, 2019

(65) Prior Publication Data
US 2019/0299939 A1  Oct. 3, 2019

Related U.S. Application Data

(62) Division of application No. 15/118,209, filed as application No. PCT/EP2014/000405 on Feb. 14, 2014, now Pat. No. 10,414,383.

(51) Int. Cl.
*B60S 1/56* (2006.01)
*B60S 1/54* (2006.01)
(Continued)

(52) U.S. Cl.
CPC ................... *B60S 1/56* (2013.01); *B05B 9/04* (2013.01); *B60S 1/0848* (2013.01); *B60S 1/46* (2013.01); *B60S 1/54* (2013.01); *B60S 1/52* (2013.01)

(58) Field of Classification Search
CPC .... B60S 1/56–606; B05B 9/04; F04B 35/008; F04B 9/107; F04B 9/1115
See application file for complete search history.

(56) References Cited

U.S. PATENT DOCUMENTS 1,441,900 A  1/1923 Warren
4,026,468 A  5/1977 Tinder et al.
(Continued)

FOREIGN PATENT DOCUMENTS

CN  103043035  4/2013
DE  10012004 A1  9/2001
(Continued)

OTHER PUBLICATIONS

Machine Translation WO2011042008A1 (Year: 2011).*
(Continued)

*Primary Examiner* — Spencer E Bell
(74) *Attorney, Agent, or Firm* — Wiley Rein LLP

(57) ABSTRACT

The invention provides an air and fluid cleaning system for propelling a cleaning fluid and air onto a vehicle vision device such as a vehicle camera system. The cleaning system comprises at least one fluid nozzle aimed at the camera; at least one cleaning fluid pump fluidly connected to both a fluid supply conduit and a cleaning fluid source; at least one air nozzle aimed at the vehicle camera; and at least one telescopic air jet fluidly connected to the air nozzle, hydraulically connected to the fluid supply conduit, and operated by the fluid pressure provided by the cleaning fluid pump; such that during a first operation time interval only cleaning fluid is propelled onto the vehicle camera and during a second operation time interval only an air jet burst is propelled onto the vehicle camera. The invention further includes a method for cleaning a vehicle camera exposed to ambient.

11 Claims, 8 Drawing Sheets

(51) Int. Cl.
  *B05B 9/04* (2006.01)
  *B60S 1/46* (2006.01)
  *B60S 1/52* (2006.01)
  *B60S 1/08* (2006.01)

(56) References Cited

U.S. PATENT DOCUMENTS

2003/0075207 A1  4/2003  Fukushima
2003/0155001 A1  8/2003  Hoetzer et al.
2004/0005230 A1  1/2004  Vockroth
2012/0117745 A1  5/2012  Hattori

FOREIGN PATENT DOCUMENTS

| DE | 102010022163 A1 | 12/2011 | | |
|---|---|---|---|---|
| DE | 102012218583 A1 | 4/2013 | | |
| FR | 2960797 A1 | 12/2011 | | |
| WO | 02/072274 A1 | 9/2002 | | |
| WO | WO-2011042008 A1 | * | 4/2011 | ............... F04B 5/02 |
| WO | 2012/138455 A1 | 10/2012 | | |

OTHER PUBLICATIONS

International Search Report and Written Opinion, dated Nov. 19, 2014, issued in International Patent Application No. PCT/EP2014/000405, filed Feb. 14, 2014.

Office Action dated Mar. 3, 2017, in related Chinese Patent Application No. 201480077995, filed on Feb. 14, 2014.

International Preliminary Report on Patentability issued, dated Aug. 25, 2016, in International Patent Application No. PCT/EP2014/000405, filed on Feb. 14, 2014.

* cited by examiner

AIR AND FLUID CLEANING SYSTEM AND METHOD FOR CLEANING VEHICLE VISION DEVICES

CROSS REFERENCE

This application is a divisional application of U.S. application Ser. No. 15/118,209, filed Aug. 11, 2016, which is a § 371 National Stage Entry of PCT/EP2014/000405, filed Feb. 14, 2014, the contents of which are hereby incorporated by reference in their entireties for all purposes.

FIELD

The invention refers to air and fluid cleaning systems for propelling a cleaning fluid and air onto a vehicle vision device or onto a sensor of a vehicle exposed to ambient. The invention furthermore refers to a method for cleaning vehicle vision devices or vehicle sensors exposed to ambient. A vehicle vision device according to the present application may be for example an external view camera or an external sensor which detects approaching objects.

BACKGROUND

Modern vehicles and particularly automobiles, mostly so-called SUVs, are provided with external view cameras to enhance the driver's vision and to improve safety. These integrated video cameras generate an image for display to the driver, operator or to other occupants or users within the vehicle's interior. Sensors in the sense of the present application are for instance such sensors in passenger cars which detect approaching and passing cars from behind and which are not visible to the driver in the rear mirrors due to the blind angle not covered by the rear view mirrors.

Rear view cameras which are often integrated into the rear bumper, the hatch or the luggage compartment door of the vehicle nearby the licence plate are normally utilized to generate a lane departure warning signal to the driver or to detect objects behind the vehicle which are normally not visible in the rear view mirror. Rear view cameras in particular for detecting the correct parking position in SUV's therefore have become quite popular.

Camera lenses or protective lens covers however, are exposed to the vehicle's surroundings and dirt and debris, mud, salt spray, etc., accumulates on the lens or a lens cover during operation of the vehicle. Particularly, if cameras and/or sensors are integrated in the rear bumper or in the luggage compartment door of the vehicle, they are particularly exposed to dirt and mud spray.

It is therefore generally known to provide external lens washing systems for cleaning lenses and sensors.

For example WO 2012/138455 A1 discloses an external lens washing system which has an aiming fixture configured to support and constrain an external lens which is exposed to the elements and susceptible to become soiled with debris. The lens washing system comprises a nozzle assembly aimed towards the external lens, having at least one laterally offset washing nozzle projecting from the aiming fixture to spray washing fluid towards the external lens surface, spraying at a shallow, glancing spray aiming angle to impinge upon and wash the lens external surface. The washing system nozzle is integrated into the camera housing and the nozzles of the washing systems are configured to generate an oscillating spray to clean the exterior objective lens surface.

Some external camera systems include convex or dome shaped lens surfaces which require specific liquid spray patterns in order to achieve a satisfying cleaning effect. This issue is already addressed in WO 2012/138455 A1 and, as a solution to this issue, it is proposed to provide fluid oscillators as cleaning fluid nozzles.

There is, however, another issue which such dome shaped lenses or lens covers, i.e., small droplets of rain or cleaning fluid adhere to the lens cover and also deteriorate the visual image displayed for instance in the navigation system of the vehicle. In order to overcome this drawback in WO 2012/138455 A1 it is proposed to provide a cover, the exterior surface of which is coated with an anti wetting property such as via a hydrophilic coating.

Such coating however has the drawback that it is susceptible to wear and that the effects of the coating are not always fully satisfying.

Another approach for keeping optical lenses on motor vehicles clean is for instance disclosed in WO 01/68425 A1. According to the teaching of this reference a transparent cover of the optical element is treated with a directed gas, in particular, an air stream, such that on moving the cover relative to the environment, no ambient atmosphere, in particular ambient air reaches the surface of the cover. In one embodiment, compressed air is blown through a nozzle, by means of which a transversal air flow is generated. This approach aims to avoid any build up of debris during operation of the vehicle right from the beginning so that eventual cleaning cycles may be minimized. A drawback of this system is that for generating a transversal air flow a constantly driven compressor is required.

Yet another cleaning concept is disclosed in WO 02/072274 A1. This publication proposes fluid and air nozzle assemblies which are capable of propelling streams of a cleaning fluid and an air mixture onto a vehicle vision device, visible indicator, or sensor. These nozzle assemblies are mounted on a vehicle adjacent to the vehicle vision device and are positioned such that liquid from one type of nozzle and air jets from another type of nozzle intersect prior to impinging upon the vehicle vision device in order to form a spray mixture that cleans the exposed surface of the vehicles vision device.

A similar concept is disclosed in D 10 2010 022 163 A1. This reference discloses a device for keeping an optical element as for instance a camera lens clean during operation of the vehicle also by generating a transversal air flow. This air flow, however, is not generated by a compressor but rather by a so called wind trap which is a passive fluid dynamical device. The known devices and methods nevertheless suffer from the drawback that they either are not effective or are relatively complex and costly.

SUMMARY

It is thus an object of the present application to provide an air and fluid cleaning system for propelling a cleaning fluid and air onto a vehicle vision device or onto a sensor as well as a method for cleaning a vehicle vision device or a sensor which provides effective cleaning and which is simple and reliable as well as relatively inexpensive.

These and other objects are achieved by an air and fluid cleaning system according to claim 1 as well as by a method according to claim 9.

Advantageous embodiments and variations of the inventive concept may be taken from the dependent claims.

In accordance with the present invention an air and fluid cleaning system for propelling a cleaning fluid and air onto a vehicle vision device or onto a sensor is provided, the cleaning system comprising:

at least one fluid nozzle aiming at the vehicle vision device or at the vehicle sensor, at least one cleaning fluid pump fluidly connected to a fluid supply conduit and to a cleaning fluid source, at least one air nozzle aiming at the vehicle vision device or at the vehicle sensor, at least one air jet generating means, fluidly connected to the at least one air nozzle, the air jet generating means being hydraulically connected to said fluid supply conduit and said air jet generating means being operated by the fluid pressure provided by the fluid pump such that during a first operation time interval of the cleaning system only cleaning fluid is propelled onto the vehicle vision system or onto the vehicle sensor and that during a second operation time interval of the cleaning system only an air jet burst is propelled onto the vehicle vision device or onto the vehicle sensor.

According to the invention, the air jet generating means is hydraulically connected to said fluid supply conduit and operated by the pressure of said fluid pump.

The air and fluid cleaning system according to the present application is thus an integrated system which does not require an onboard compressor but is rather driven and operated by the fluid pump which is anyway present for onboard screen wash applications, i.e., headlamp or windshield or rear window cleaning systems. A vehicle vision device may be an imaging device using solid-state technologies, for instance CMOS or CCD pixel sensor technology in combination with for instance a video monitor display for automotive navigation systems. A vehicle vision device may comprise a camera-lens system with at least one lens surface or cover surface exposed to ambient.

A fluid nozzle within the sense of the present application may be a fluidic oscillator, a pencil jet nozzle or the like. The fluid nozzle may have an adjustable eye ball nozzle body.

An air nozzle according to the present application may be any type of nozzle through which an air jet, preferably a pencil jet may be ejected.

The fluid pump according to the invention may be a conventional type fluid pump, particularly a conventional type impeller pump with one or several impeller wheels. The fluid pump may have one or more fluid exit ports and at least one fluid entry port.

The fluid pump may be either designed as a dual pump with a switchable sense of rotation or a mono pump with only one sense of rotation.

An operation time interval of the cleaning system may be but must not necessarily congruent with the operation time interval of the cleaning liquid pump.

One aspect of the present application is to hydraulically connect an air jet generating means to a cleaning fluid delivery system so that no separately driven compressor is required.

Another aspect of the inventive concept and the method according to the invention is to provide liquid cleaning and blasting off any liquid droplets from a vision device or from a vehicle sensor, particularly from a camera or sensor lens surface in a consecutive sequence.

In one advantageous embodiment according to the invention, there is provided an air and fluid system, the air jet generating means of which includes a piston cylinder arrangement, where the piston is reciprocally arranged within the cylinder and where the piston is hydraulically driven by the pressure of the cleaning fluid. It is within the scope of the present application that the system includes one or several piston cylinder arrangements.

It is also within the scope of the present application that the system could include more than one air jet nozzle and more than one liquid jet nozzle associated with one vehicle vision device or vehicle sensor.

A piston cylinder arrangement in the sense of the present application may be a piston which is movable back and forth within a cylinder and which is sealed with respect to the cylinder walls so that the piston divides the cylinder into a fluid volume and into an air volume.

Fluid in the sense of the present application is meant to denote a liquid whereas the term "air" is meant to denote air or any other gas.

In one advantageous embodiment an air blast through an air port of the cylinder is generated upon a forward stroke of the piston. The piston may for example be biased in a rest position and upon pressure of the cleaning fluid acting on one side of the piston, the piston may suddenly be advanced if the pressure of the cleaning fluid acting on the piston exceeds a certain pressure amount, thereby producing an air jet burst on the sudden forward movement.

Alternatively, in one advantageous design of the piston-cylinder arrangement/piston-cylinder unit, the piston cylinder unit may generate an air blast through an air outlet of the cylinder by a backwards stroke of the piston.

In one embodiment according to the present application where an air blast is generated on a forward stroke of the piston, the piston is preferably biased in a first rest position by a spring member, for example by a coil spring, and may be advanced by the pressure of the cleaning fluid into a second position against the biasing force of the spring member, thereby propelling an air jet towards the at least one air nozzle. The spring force of the spring member may be chosen so that the piston will suddenly be advanced, if a given hydraulic pressure of the cleaning fluid will be exceeded.

Additionally and/or alternatively the air port of the cylinder may be provided with a check valve or any other appropriate pressure regulating means in order to allow propelling an air jet upon a sudden forward movement of the piston.

Additionally and/or alternatively there may be provided a second spring member within the cylinder biasing the piston into the forward direction, the second spring member having a slightly lower spring force than the first spring member so that the piston is just held in its rest position and upon exceedance of a certain liquid pressure is accelerated into its advanced position.

In another favourable embodiment of the air and fluid cleaning system according to the present application the piston is biased in a first rest position by a first spring member and may be advanced by the pressure of the cleaning fluid against the biasing force of the spring member into a second loaded position, propelling an air jet towards said at least one air nozzle thereby taking place upon pressure relief of the cleaning fluid which causes a backward stroke of the piston.

Also, if an air jet is being generated upon a backward stroke of the piston, the piston may be connected to a second spring element boosting the backward stroke of the piston, i.e., pulling the piston in the same sense or in the same direction as the first spring element.

The second spring element may be in the form of an elastic convolute partly enclosing an air volume. The elastic convolute may serve as a spring element and as a sealing element as well. The function of the convolute as a spring element is however only secondary, the primary function is the function as a sealing element.

Preferably, the cylinder may comprise at least one cleaning liquid port and at least one air port which are not in fluid communication with each other.

Additionally, the cylinder may comprise a vent port. Such vent port may be particularly advantageous, if the piston cylinder arrangement is designed such that first the piston has to be brought into a loaded position and then generates an air jet upon a backward stroke. Such air vent will allow easy travelling of the piston from the rest position into the loaded position.

Preferably, the cleaning fluid pump is designed as an impeller pump. Such impeller pumps are quite common in screen wash applications.

In one embodiment of the air and fluid system according to the invention, the sense of rotation of the impeller pump may be switched so that the flow direction of the cleaning fluid may be changed. For example, in a first operation interval the fluid pump operates in one direction delivering fluid to the at least one fluid nozzle, cleaning any dirt from the vehicle vision device. During a second operation time interval the cleaning fluid pump switches direction and operates the air jet generating means which is preferably designed as a telescopic air jet, thereby removing any water droplets from the critical surface of the vehicle vision device. The surface may be a dome shaped cover or a dome shaped lens of a camera.

The cleaning fluid pump may comprise at least two cleaning fluid pressure ports, a first pressure port being fluidly connected to the air jet generating means and a second pressure port being connected to the cleaning fluid supply conduit.

In a second embodiment according to the present application, the cleaning fluid pump is designed as a mono pump with only one rotational sense of the impeller. During a first operation interval of the cleaning system the fluid pump supplies fluid to the cleaning system, i.e., to said at least one fluid nozzle which will then wash the vehicle vision device, removing any dirt from the critical surface of the vehicle vision device. During that first operation time interval of the system the pump also delivers fluid to the air jet generating means, thereby forwarding the piston from its rest position into a loaded position. Once the pump stops, this will cause a pressure relief at a fluid port of the air jet generating means which will allow the piston to fulfil a backward stroke upon which a blast of air will be propelled towards the air nozzle thereby removing any water droplets from the exposed surface of the vehicle vision device.

In the sense of the present application the operation cycle from pressure relief at the fluid port of the air jet generating means until termination of the blasting action is considered to be the second operation time interval of the system.

According to another aspect of the invention there is provided a method for cleaning a vehicle vision device or a sensor of a vehicle exposed to ambient comprising providing an air and fluid cleaning system including at least one fluid nozzle, at least one cleaning fluid pump fluidly connected to a fluid supply conduit and to a cleaning fluid source, at least one air nozzle and at least one air jet generating means fluidly connected to the at least one air nozzle, aiming the at least one fluid nozzle at the vehicle vision device or at the vehicle sensor and propelling at least one spray or jet of cleaning fluid onto the vehicle vision system or onto the sensor during a first operation time interval of the air and fluid cleaning system, aiming said at least one air nozzle at the vehicle vision device or at the sensor and propelling at least one air jet burst onto the vehicle vision device or the vehicle sensor during a second operation time interval of the cleaning system, thereby operating the air jet generating means by the fluid pressure provided by the fluid pump.

According to the invention preferably the first and the second time intervals are distinct and do not overlap.

Preferably, the operation sequence according to the method is that first of all cleaning fluid is propelled towards the vehicle vision system or towards the vehicle sensor in order to remove any dirt from the exposed surface of the vehicle vision system or the vehicle sensor. In a second step, i.e., during a second operation time interval of the system, at least one air jet blast is directed towards the exposed surface of the vehicle vision device or the vehicle sensor thereby removing any residual droplets of cleaning fluid from the exposed surface.

The air jet operation is preferably conducted by at least one air jet generating means which is preferably designed as a telescopic air jet, which may be in the form of a cylinder piston arrangement where the piston is movable back and forth within a cylinder producing an air jet burst either on a forward stroke of the piston or on a backward stroke of the piston.

Preferably, in a sequence of two consecutive operating time intervals, during the first operating time interval cleaning fluid is propelled onto the vehicle vision device or the sensor and during the second operation time interval at least one air jet burst is propelled onto the vehicle vision device or the vehicle sensor thereby blasting away any residual cleaning fluid droplets from the vehicle vision device or from the vehicle sensor.

Preferably, the method according to the invention comprises the utilization of the air and fluid cleaning system as specified herein.

DESCRIPTION OF THE DRAWINGS

The invention herein after be explained by way of example with reference to the accompanying drawings in which:

FIG. 4*a* shows the rest position, FIG. 4*b* shows the loaded position and FIG. 4*c* shows the system just after generation of an air burst.

FIG. 5*a* shows the rest position, FIG. 5*b* shows the loading position and FIG. 5*c* shows the air jet generating means just upon generation of an air burst.

FIG. 8*a* shows the open state of the priming vent valve and FIG. 8*b* shows the close state of the priming vent valve.

DETAILED DESCRIPTION

Figure 1:
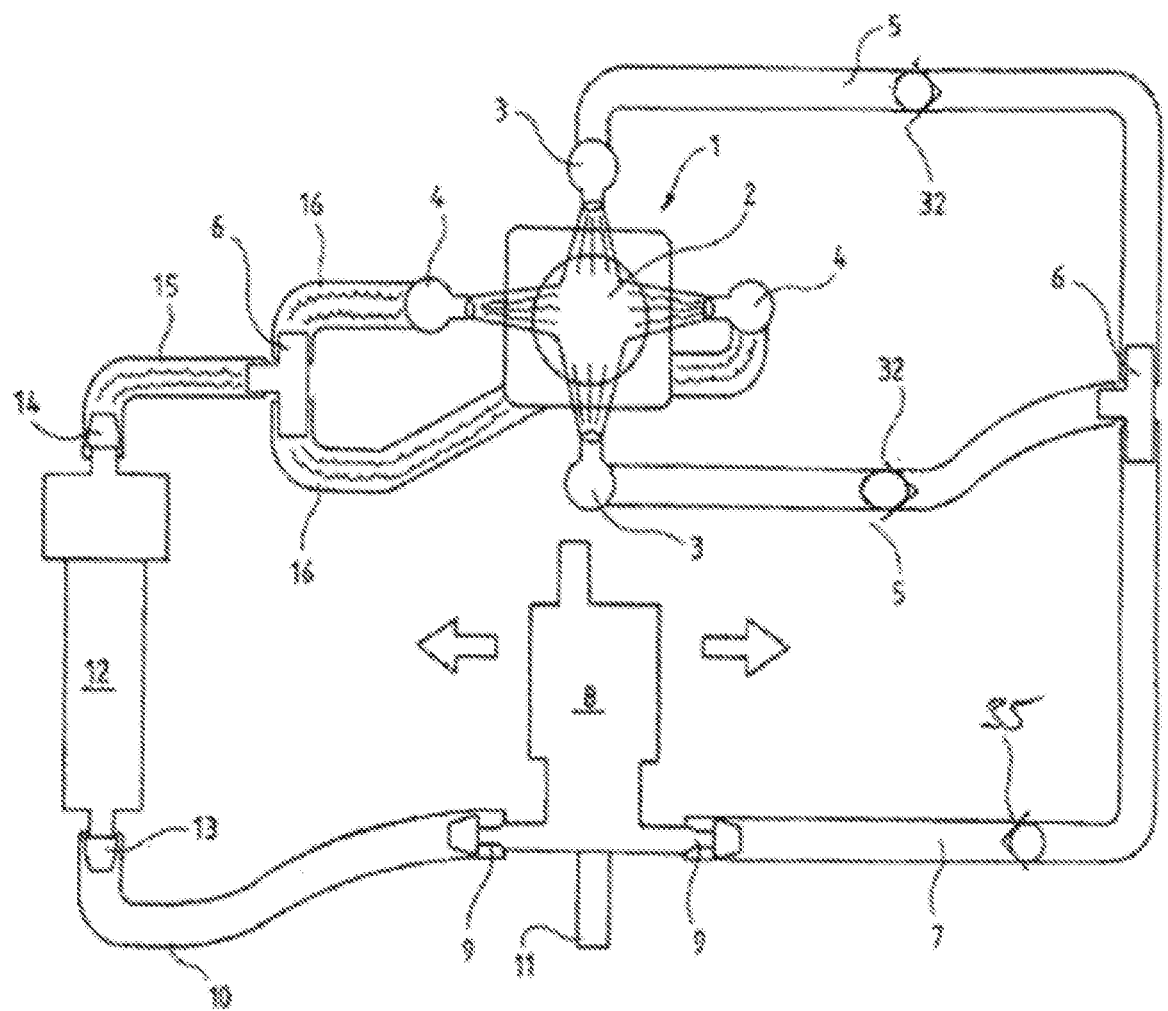
FIG. 1 shows a schematic view of a first air and fluid cleaning system according to the invention using a dual pump system.

Turning now to the first embodiment of the invention according to FIG. 1 and FIG. 2.

FIG. 1 shows in principal a cleaning fluid circuit (open circuit) for an onboard camera system of a passenger vehicle, for instance for the rear view camera system of a Sports Utility Vehicle attached to the hatch of the car adjacent a license plate. The rear view camera 1 as schematically shown in the drawings, which is considered as a vehicle vision device according to the terminology of this application, includes a dome shaped lens 2 which is exposed to ambient and may be a lens of a wide angle digital camera which captures a rear view picture and transfers this picture to a video monitor display within the passenger cabin of the vehicle. The video monitor system may be activated automatically each time the driver engages the reverse gear of the vehicle.

The system comprises a set of two fluid nozzles 3 and two air nozzles 4 which are mounted relatively close to the vehicle mounted rear view camera 1. Both, the fluid nozzles 3 and the air nozzles 4 are aiming at the lens 2. Generally, all of the nozzles 3 and 4 may have the same configuration as pencil jet nozzles. A person skilled in the art may, however appreciate that the fluid nozzles 3 may produce a different spraying pattern. The fluid nozzles 3 for example may also be spray nozzles or oscillating nozzles.

The spaying pattern or jet characteristics of the nozzles are not critical to the invention. Moreover, a person skilled in the art will appreciate that the number of nozzles and their arrangement relative to the lens 2 is not critical to the invention.

The fluid nozzles 3 are fluidly connected to flexible fluid supply hoses 5 both connected via t-connector 6 to a primary fluid supply hose 7. The fluid supply hoses 5, 7 constitute the fluid supply conduit in the sense of the present application.

The primary fluid supply hose 7 is connected to a cleaning fluid pump 8 which may be an electrically driven impeller pump and in the embodiment according to FIG. 1 is a so called dual pump which means that the cleaning fluid pump 8 is operable in two directions. This is simply achieved by switching the impeller between two rotational senses. The cleaning fluid pump 8 includes two pressure ports 9, one connected to the primary fluid supply hose 7 and the other one connected to a secondary fluid supply hose 10.

Furthermore, the cleaning fluid pump 8 includes a suction port 11 which is connected to a cleaning fluid source via additional hoses and/or conduits not shown. The cleaning fluid source may be a cleaning fluid vessel somewhere arranged within the engine compartment of the vehicle.

The secondary fluid supply hose 10 is connected to an air jet generating means 12, for the sake of simplicity hereinafter referred to as air jet.

According to the first embodiment, the air jet 12 includes a cleaning fluid port 13 and an air port 14. The cleaning fluid port 13 is in communication with the cleaning fluid pump 8 via secondary fluid supply hose 10, the air port 14 is in communication with air supply hoses 15, 16 numeral. Reference numeral 15 denotes a primary air supply hose and reference 16 denotes the air supply hose between a t-connector 6 and the air nozzles 4.

It should be noted that the air port 15 of the air jet 12 and the cleaning fluid port 13, as explained in detail hereinafter, are not in direct fluid communication with each other, however, the air jet 12 is being operated by the cleaning fluid via cleaning fluid pump 8 such that it generates a burst of air which will be propelled towards the air nozzles 4.

As mentioned before, the cleaning fluid pump 8 is designed as a dual pump with an electrically switchable sense of rotation. During a first operation time interval where the cleaning fluid pump 8 operates in one first direction, cleaning fluid is delivered from the suction port 11 via primary fluid supply hose 7 and fluid supply hoses 5 towards fluid nozzles 3 which both deliver a fluid spray either in the form of an oscillating jet, a pencil jet or a spray onto the lens 2 of the rear view camera 1. During a second operation time interval of the system the pump switches direction and delivers cleaning fluid by a secondary fluid supply hose 10 to the air jet 12 thereby operating the air jet 12 such that the air jet 12 propels a burst of air via air supply hoses 15, 16 towards the lens 2. As the air nozzles 4 as well as the fluid nozzles 3 aim at the lens 2 during the second operation time interval consecutive to the first operation time interval the air blast off any droplets which might have collected on the lens 2 and which might have remained from the liquid cleaning action.

Although the operation to the system has been described here by way of an example of two consecutive different cleaning actions (first liquid, then air), a person skilled in the art will appreciate that the system may be operates such that several consecutive first operation time intervals as well as several consecutive second operation time intervals may be triggered so that either several fluid cleaning cycles or several air blasting cycles may be provided. A person skilled in the art will appreciate that for example only an air blasting cycle may be triggered in the event the lens collected droplets which have been raised from a wet street.

The air and fluid cleaning system according to the present invention could be automatically activated in the event that the driver engages the reverse gear. As mentioned before, the system could also be automatically activated in the event that a high level of dirt/debris has collected onto the camera lens. A sensor could be used to detect the level of dirt/debris on the lens and send a signal to activate the system.

The camera itself could be utilized for sensing the level of dirt/debris which has been collected on the surface of the lens, for instance by comparing two different images which have been taken at different times. For instance an image taken by the camera could be compared to a reference image taken with the same camera through a perfectly clean lens. A person skilled in the art will appreciate that other methods for detecting whether dirt has been build up on the lens or not may be applied for example by measurement of the refraction through the lens.

In the following with reference to FIG. 2*a* and FIG. 2*b* the structure and function of the air jet according to the first embodiment of the invention will be explained.

The air jet 12 generally includes a cylinder 17 formed by a piston housing 18 and a closure cap 19. The closure cap 19 may be press fitted onto the piston housing 18 so that the cylinder 17 may be of a simple two part configuration. Within the piston housing 18 a piston 20 is reciprocally arranged. The piston 20 is sealed against the cylindrical inner wall of the piston housing 18 by a piston seal 21. The piston housing 18 is preferably provided with a priming vent valve 34 allowing priming of the system, i.e., the secondary fluid supply hose as well as the cylinder 17 upstream the piston seal 21 during installation of the system.

This priming vent valve 34 might be for example arranged at the bottom of the piston housing 18 upstream the piston seal 21 or at the cleaning fluid port 13.

For instance with the air jet 12 as shown in FIG. 2 the priming vent valve 34 is arranged at the bottom of the piston housing 18. One embodiment of the priming vent valve 34 is shown in FIG. 8. This priming vent valve 34 may be provided at the air jet 12 according to any of the embodiments as described herein and later will be described in more detail.

The piston seal 21 might be a rubber ring or a ring from another elastomeric material. The piston seal 21 surrounds a platform 22 of reduced diameter at the front face of the piston 20 and is properly held in place due to the stepped configuration of the front face of the piston and due to the fact that the piston seal 21 elastically embraces the platform 22. Persons skilled in the art will appreciate that the term platform also covers a collar or any other design. The piston seal 21 may also be arranged within a peripheral channel of the piston.

In the embodiment as specified in FIG. 2 the cleaning fluid port 13 is integral with the piston housing 18 whereas the air port 15 is integral with the closure cap 19.

Figures 2A, 2B:
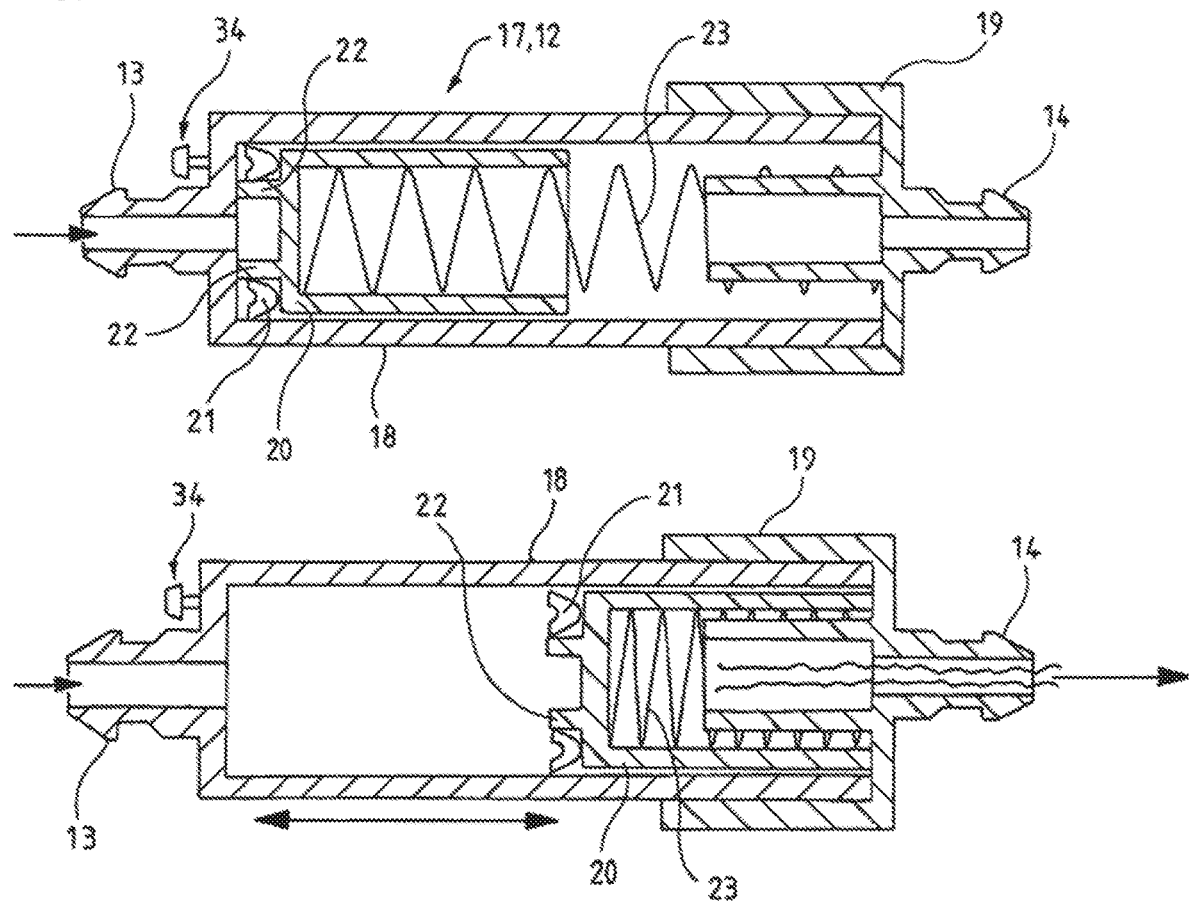
FIG. 2*a* and FIG. 2*b* show the air jet generating means in the form of a cylinder piston arrangement in a first rest position (FIG. 2*a*) and in a second operating position (FIG. 2*b*).

FIG. 2a shows the piston 20 in its rest position, biased in this position by a coil spring 23 acting on the piston on the one hand and on the closure cap 20 on the other hand.

Upon ingress of cleaning fluid into the cylinder 17 during a second operation time interval of the system, i.e., after the cleaning fluid pump has switched direction so that it delivers cleaning fluid to the air jet 12, pressure will build up and act on the front face of the piston until a given operating pressure is reached. The piston 20 and the piston seal 21 will then start to extend when this given operating pressure is reached. As these extend, the coil spring will compress and a maximum piston extension will be reached.

As this quick movement of piston 20 and piston seal 21 happens this will produce a blast of air within the jet 12, forcing it through the air port 15 of the closure cap 19 along the primary air supply hose 15 and the air supply hoses 16 through the air nozzles 4 onto the lens 2. Of course, the closure cap 19 is fixed such that it withstands the raised pressure within the cylinder 17.

When the pump ceases to deliver cleaning fluid to the air jet 12 the piston 20 will return to its initial position as shown in FIG. 2a.

In the following another embodiment of the invention will be described, same parts within the second embodiment will be denoted by same reference numerals as in the first embodiment.

According to the second variant of the air and fluid cleaning system according to the invention during a first operation time interval of the system the cleaning fluid supply pump operates and supplies cleaning fluid to the fluid nozzles 3 which will then wash the rear view camera 1 removing any dirt from the lens 2. Once the pump stops, the air jet 12 will produce a blast of air removing any water droplets from the lens 2. As will be explained hereinafter an air blast is generated upon return stroke of the piston 20 of the air jet 12.

In each case, i.e., regardless whether an air blast is generated upon forward movement of the piston 20 or an a return stroke of the piston 20, any backpressure that is created by the air jet 12 will return towards the fuel tank/container. To prevent this backpressure from reaching the fluid nozzles and creating an unwanted secondary cleaning action, the air and fluid cleaning system according to the present invention includes several pressure retention valves 32 preventing transmission of the backpressure wave towards the fluid nozzles 3. In order to allow the system to properly work during the fluid cleaning action, the pressure retention valves 32 are configured to open, if the fluid pressure exceeds a certain amount.

Additionally, to prevent dripping of the fluid nozzles 3 after wet cleaning has been performed, there could be provided one or several check valves 35 preventing emptying of the fluid spray hoses after a wet cleaning acting has been performed. One such check valve 35 is for example located in the primary fluid supply hose 7 of the embodiment according to FIG. 1. The position of the pressure retention valves 32 and the check valve 35 is not critic to the invention. Valves, in particular pressure retention valves close to the fluid nozzles will allow fluid to pass through in both directions when a certain pressure is exceeded. Generally the valves could be different types of valves such as ball check valves and diaphragm valves.

Generally valves may also be provided in the primary air supply hose 15 and/or in the air supply hose 16.

Instead of t-connectors 6 three way valves may be provided at the locations where the t-connectors 6 are arranged.

A person skilled in the art will generally appreciate that the air and fluid system according to the present invention indeed may be designed without any valves and properly functions without any valves. There may be either an air fluid system with valves added close to the nozzles or the air and fluid system according to the present invention may utilize a single valve either on the fluid side and/or on the air side.

In this embodiment the cleaning fluid pump 8 is designed as a mono pump, i.e., is not switchable in the rotational direction. During a first operation time interval the cleaning fluid pump 8 supplies cleaning fluid to the air jet 12 and to the fluid nozzles 3 in parallel. The cleaning fluid pump 8 has only one pressure port 9 and primary as well as secondary fluid supply hoses 7, 10 are branched off from pressure port 9 via t-connector 6. T-connector 6 may be directly connected to and pressure port 9, as a person skilled in the art will appreciate.

While the cleaning fluid pump 8 is being operated, cleaning fluid is delivered to the air jet 12 and to the fluid nozzles 3 in parallel. While cleaning fluid is being forwarded towards the lens 2 the piston 20 of the air jet 12 will be urged from a rest position towards a loaded position. Once the cleaning fluid pump 8 stops there will be a relief of pressure and the piston 20 may fulfil a backward stroke thereby generating an air blast as hereinafter will be described with reference to FIG. 4a to FIG. 4c.

Figure 4A:
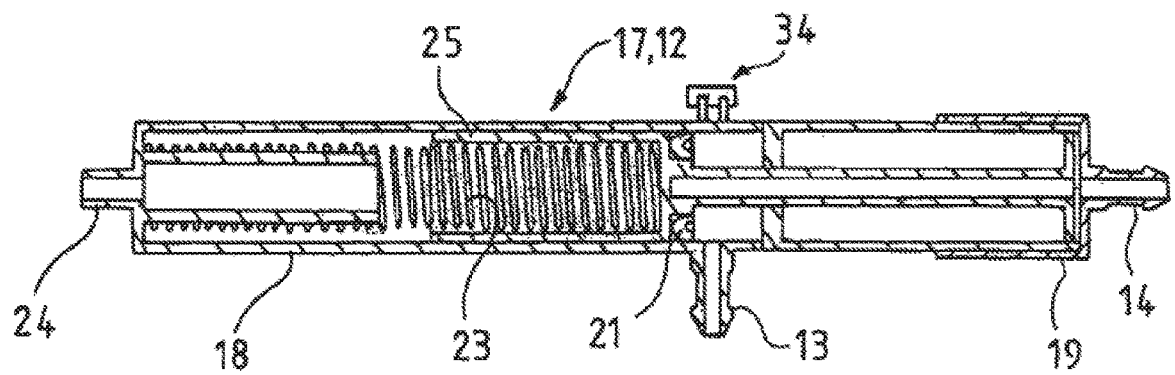
FIG. 4*a* to FIG. 4*c* show a second embodiment of an air jet generating means according to the invention for use with the system according to FIG. 3, where
Figure 4B:
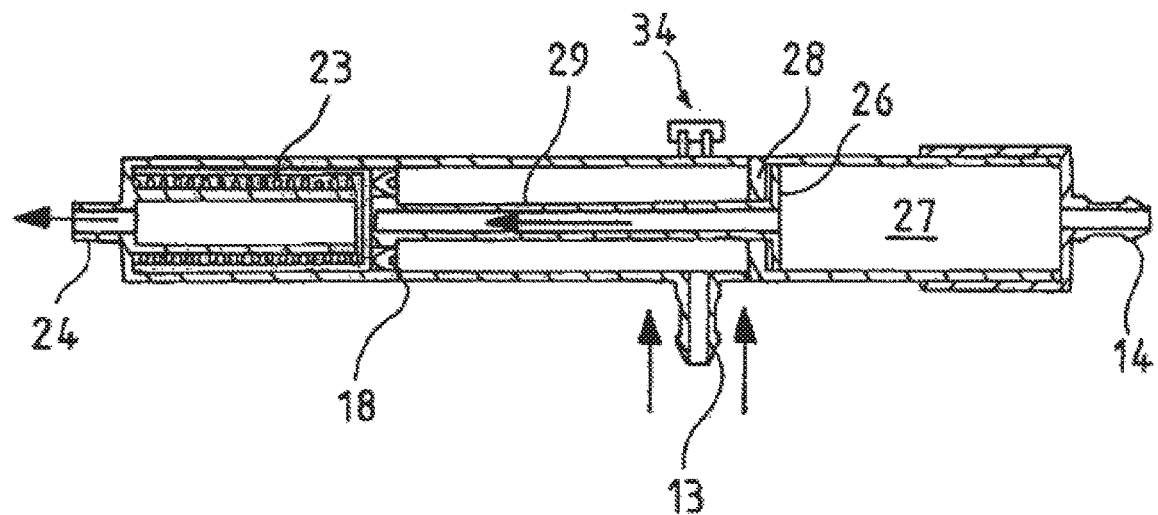
Figure 4C:
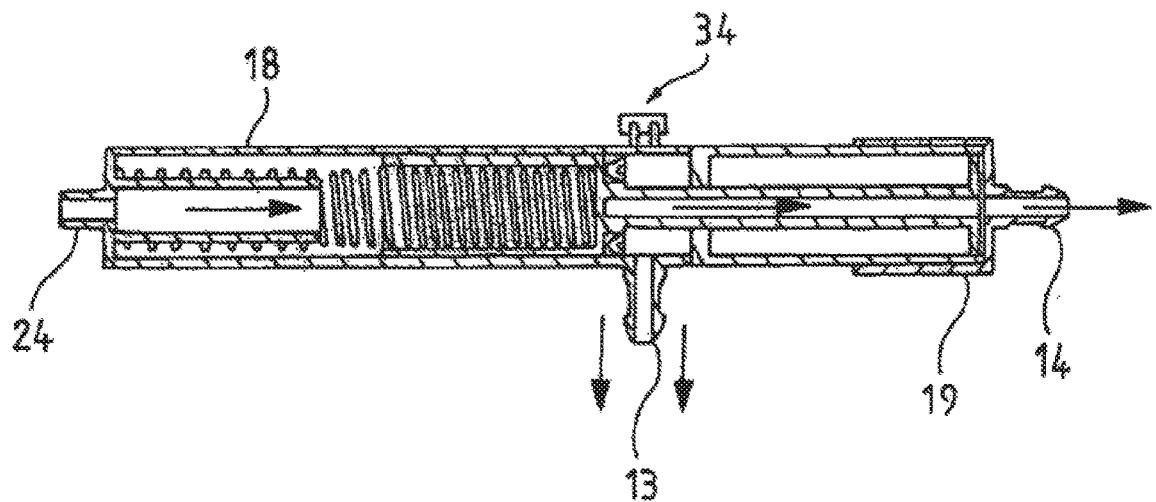

As may be taken from FIG. 4a to FIG. 4c, the cylinder 17 includes a piston housing 18 and a closure cap 19 as with the air jet 12 of the first embodiment. The piston housing 18 at one end face is provided with a vent port 24 at the opposite end face of the piston housing 18 there is provided the closure cap 19 with the air port 14. The piston housing 18 has a cleaning fluid port 13 on the periphery of the cylindrical housing extending approximately radially from the piston housing 18 and at a position about one third of the length of the piston housing 18. The piston includes a piston rod 29 which extends between a cup shaped base 25 and a disk shaped piston head 26. The piston head 26 is arranged within an air chamber 27 of the cylinder 17, the piston rod 29 thereby extending through a bottom of the air chamber 27 and is sealed for example by a fixed o-ring-sealing 28. The cup shaped base 25 is provided with a peripheral piston seal 21 defining a second air chamber between the piston base 25 and the vent port 24.

As with the first embodiment the piston housing 18 includes a priming vent valve 32. The priming vent valve 34 could for example be arranged in the piston housing 18 at a circumferential portion thereof in proximity of the cleaning fluid port 13 or at the cleaning fluid port so that upon ingress of fluid into the cleaning fluid port 13 air eventually trapped in the piston housing upstream the piston seal may escape through that priming vent valve 34 so that the system may be primed during assembly.

One example/embodiment of a priming vent valve 34 is shown in FIG. 8. The priming vent valve 34 is provided at a venting hole 35 in the wall of the piston housing 18. Within the venting hole 36 there is provided a peg 37 projecting from the venting hole 36 to the outside of the piston housing 18 and its free end projecting from the venting hole 36. The peg 37 has a circumferential groove receiving an o-ring seal 39. The priming venting valve 34 moreover includes a circumferential collar 40 within directed hook-like projections 41 forming a snap-fit with a fitting 42 on a closure cap 43 received in the venting hole 36. The closure cap 43 for example may be designed as a generally round/cylindrical member with a tube-like fitting 42 receiving the peg 37 in a venting hole 44. The venting hole 44 is designed as a stepped bore with a larger diameter upstream the venting direction and a smaller diameter downstream the venting direction. The transition from the larger diameter to the smaller diameter is designed as a sloping shoulder.

At its outer circumference the fitting 42 is provided with a circumferential groove 45 the cross section of which corresponds to the hook-like projection 41 of the collar 40.

Figure 8A:
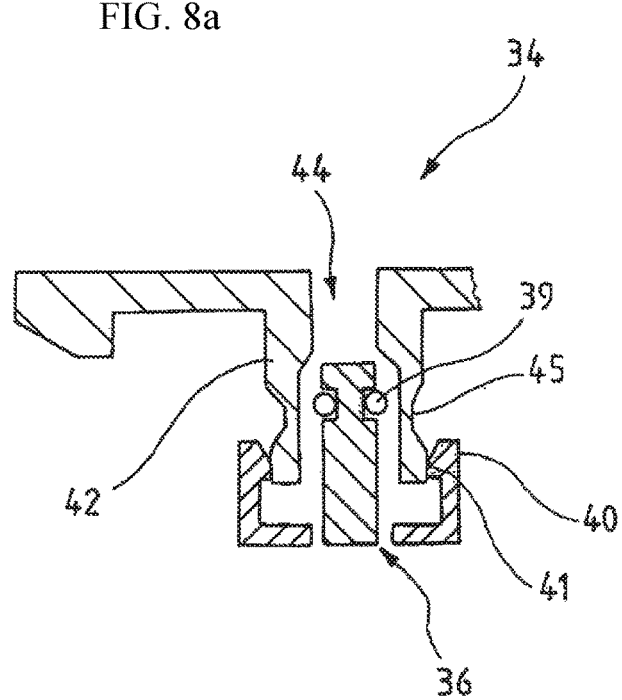
FIG. 8*a* and FIG. 8*b* provide a cross-sectional view through a priming vent valve where

FIG. 8a shows the assembly state of the priming vent valve 34 when the air and fluid cleaning system of the present invention is to be assembled in a vehicle. In this state a priming vent valve 34 is open so that the air jet 12 maybe primed prior to its first use.

Figure 8B:
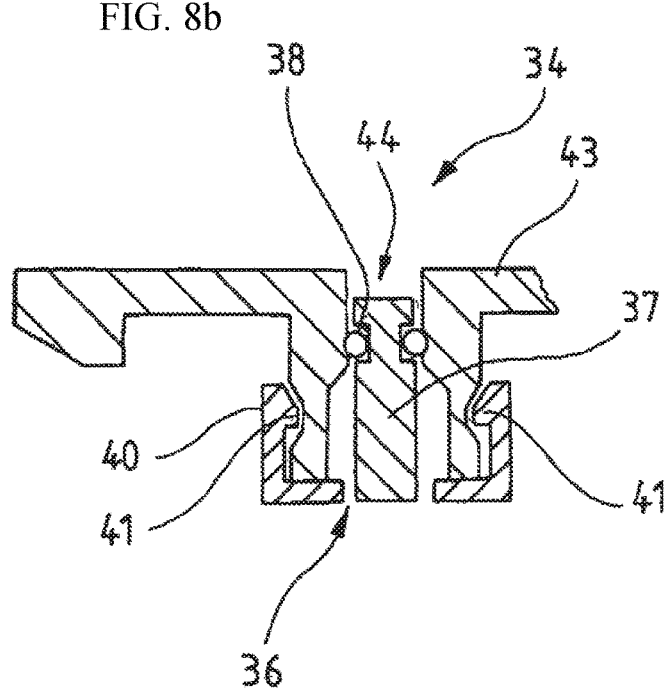

FIG. 8b shows the priming vent valve 34 in the closed state where the closure cap 43 has been pressed inwardly so that the fitting 22 firmly engages with the projections 41 and forms a closed snap-fit connection. It this state the peg 37 extends into the venting hole 44 to such extent that the o-ring seal 39 engages the inner wall of the smaller diameter area of the wall constituting the venting hole 42 so that fluid may not escape through the priming vent valve 34 anymore.

Generally, the closure cap 43 is in the unlocked position according to FIG. 8a during assembly of the air and fluid cleaning system and during mounting of this system. After the air jet 12 has been primed, the closure cap 43 will be pushed inwards so that the snap-fit connection of the fitting 42 in the venting hole 36 is established and the system is sealed off.

A person skilled in the art will appreciate that such a single actuation vent valve 34 may be designed in a more simple way, for example a venting hole may simply be closed by a plug or other type of closure means.

Turning now to the operation of the system depicted in FIG. 4a to FIG. 4c, in FIG. 4a the piston 20 is held in its rest position by the coil spring 23. Upon ingress of cleaning fluid into the space between the bottom 30 of the air chamber 27 a build up of pressure will take place forcing the piston 20 towards the end of the piston housing 18 provided with the vent port 24. Due to the presence of the vent port, air trapped between the base of the piston housing 18 and the piston seal 21 may escape. The piston 20 will be moved until its end of travel position shown in FIG. 4b where the cup shaped base 25 of the piston 20 abuts the base of the piston housing 18. When the fluid pump 8 ceases to operate cleaning fluid exits the cleaning fluid port 13 and the pressure of the cleaning fluid is no longer present, causing the piston 20 to rapidly move back to its original position (backward stroke), decompress the coil spring 23, and creating a burst of air through the air port 14.

Figure 3:
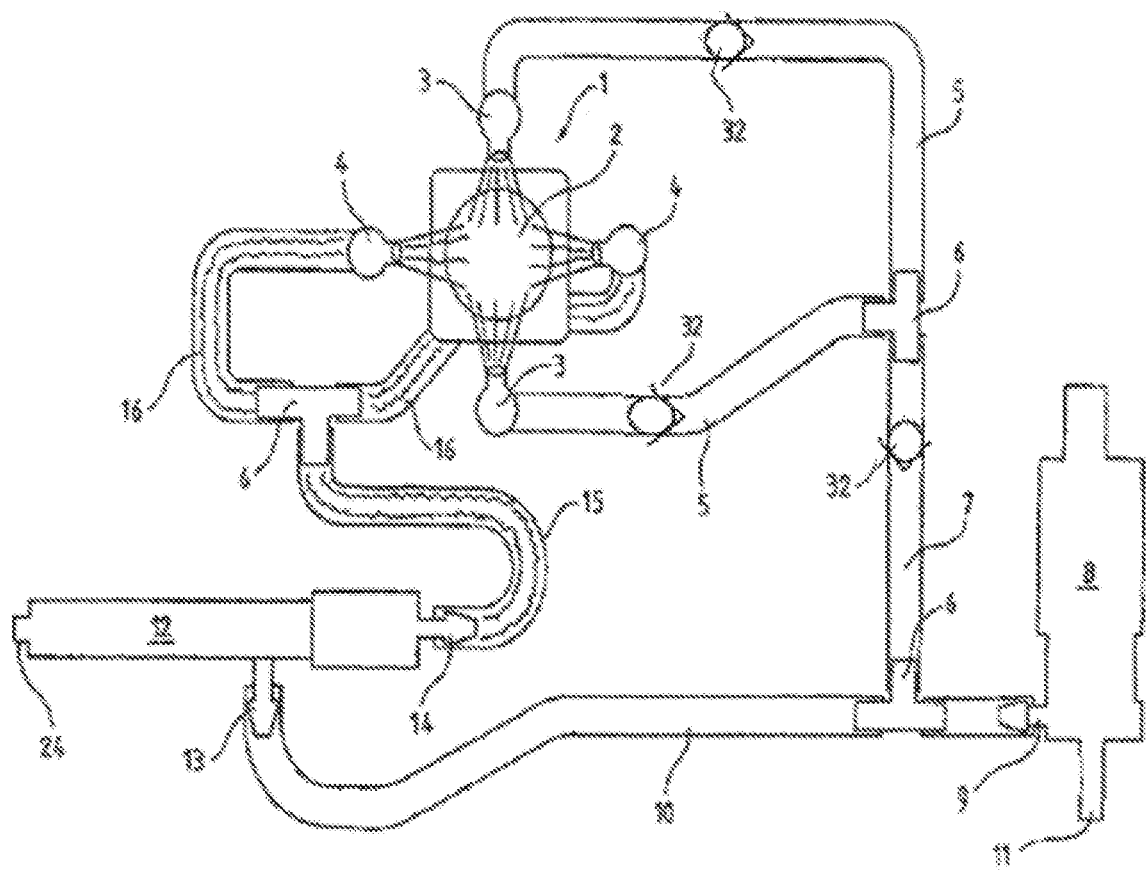
FIG. 3 shows a second embodiment of the air and fluid cleaning system according to the invention using a mono pump as a cleaning fluid pump.
Figure 5A:
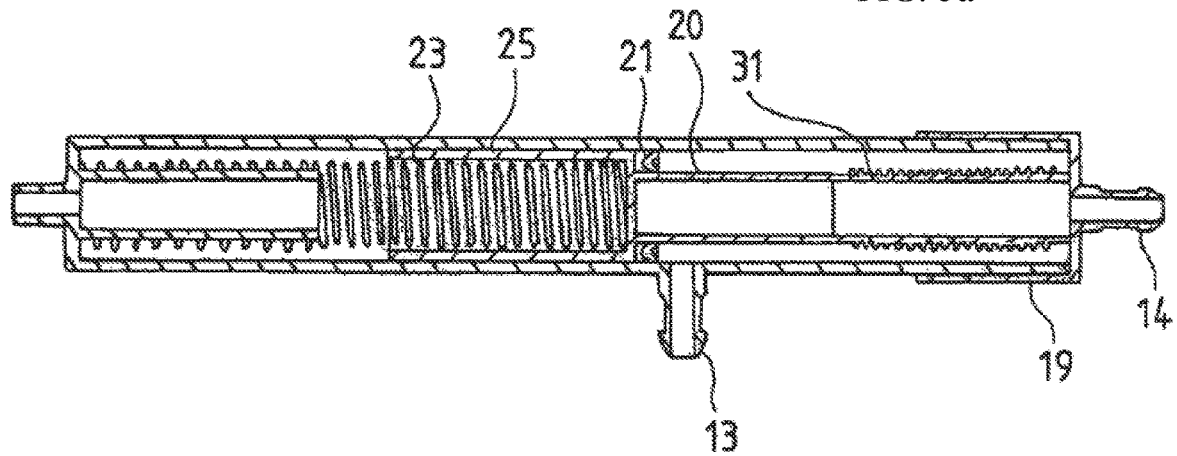
FIG. 5*a* to FIG. 5*c* show a third variant of the air jet generating means for use with the system shown in FIG. 3, where
Figure 5B:
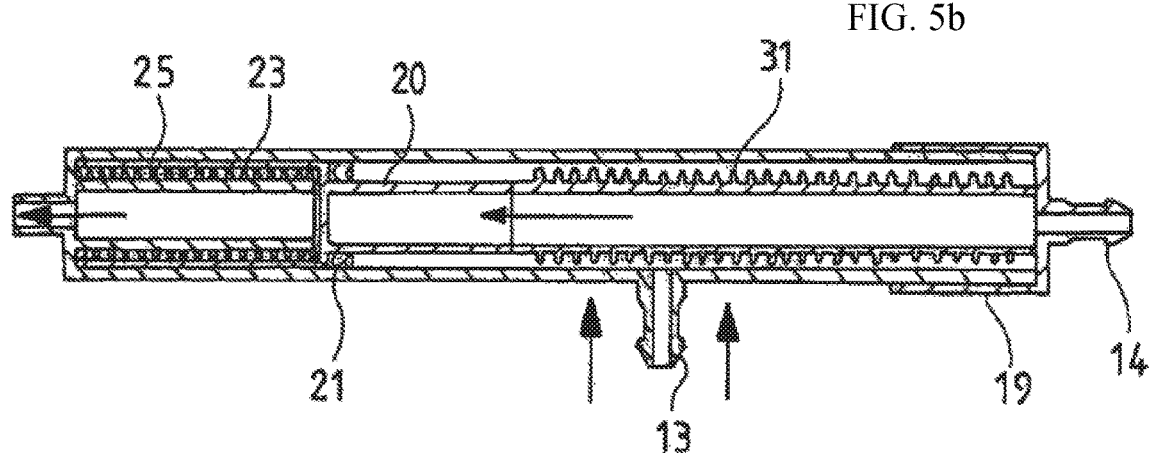
Figure 5C:
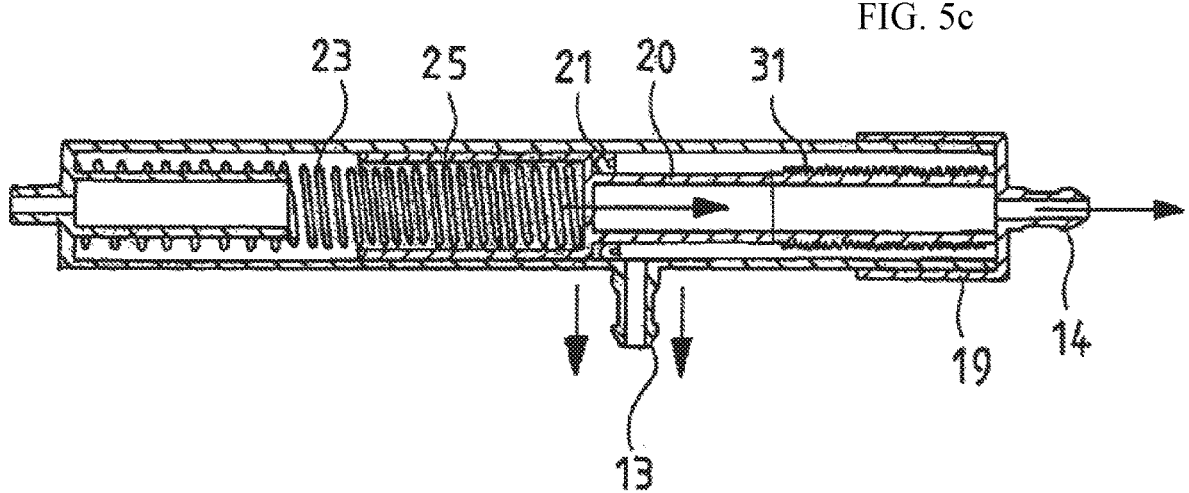

FIG. 5a to FIG. 5c show a third embodiment of the air jet 12 to be used in combination with the system of FIG. 3. The air jet 12 according to this embodiment is quite similar to the embodiment according to FIG. 4a to FIG. 4c, and the same parts will be denoted by same reference numerals.

In this variant of the air jet there is no separate air chamber provided within the cylinder housing 18. Instead, there is provided a rubber convolute 31 which defines with the hollow cylindrically shaped piston head 26 an air chamber communicating with air port 14. Due to this design there is no need for a separate air chamber within piston housing so that also additional sealing measures for a piston rod are not required.

The rubber convolute itself has elastically properties in the sense that it forms a spring member which supports a backward stroke of the piston 20, i.e., pulls the piston 20 towards the air port 14. It should be noted that the spring force of the rubber convolute 31 is minor compared to the spring force of the coil spring 23. A person skilled in the art will appreciate that the term rubber in the sense of the present application does not necessarily mean natural rubber but stands for a material with elastic properties.

Figure 6:
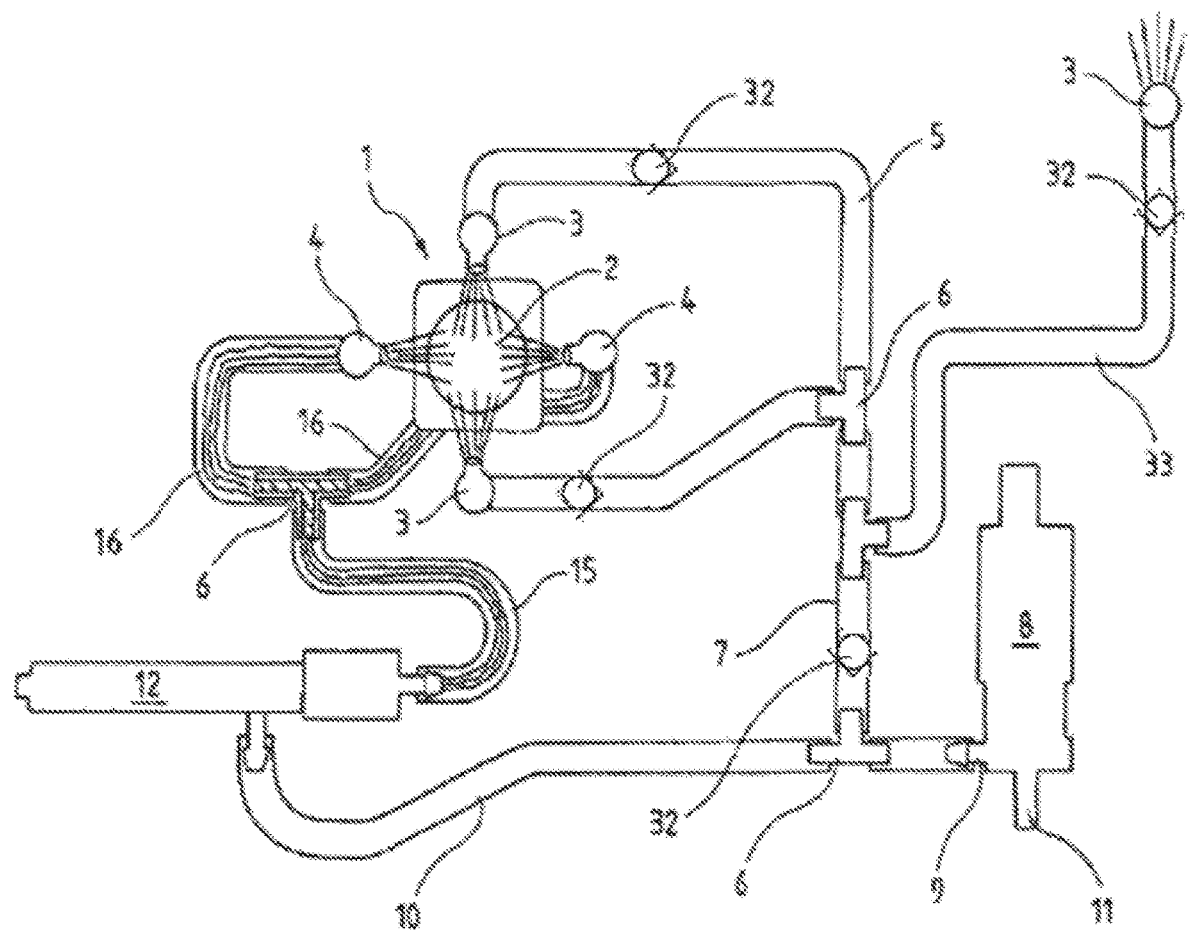
FIG. 6 shows a fourth embodiment of the air and fluid cleaning system according to the invention using a mono pump as a cleaning fluid pump.

FIG. 6 shows a fourth embodiment of the air and fluid cleaning system of the present invention. In this fourth embodiment same parts are denoted by same reference numerals. The fourth embodiment of the air and fluid cleaning system is quite similar to the embodiment of the cleaning system as shown in FIG. 3, i.e., utilizes a cleaning fluid pump 8 which is designed as a mono-pump. The system includes a branch fluid line 33 branched off to a further fluid nozzle 3 directed to the rear screen of the vehicle so that at the same time the cleaning action of the rear fuel camera 1 is performed a rear wash system is being operated. A person skilled in the art will appreciate that more than one additional wash system/fluid nozzle may be fed by the same cleaning fluid pump 8. The system may be designed such that several fluid nozzles 3 may be fed with liquid cleaning fluid selectively, for instance by a switchable valve which may be provided within the branch fluid line 33.

Figure 7:
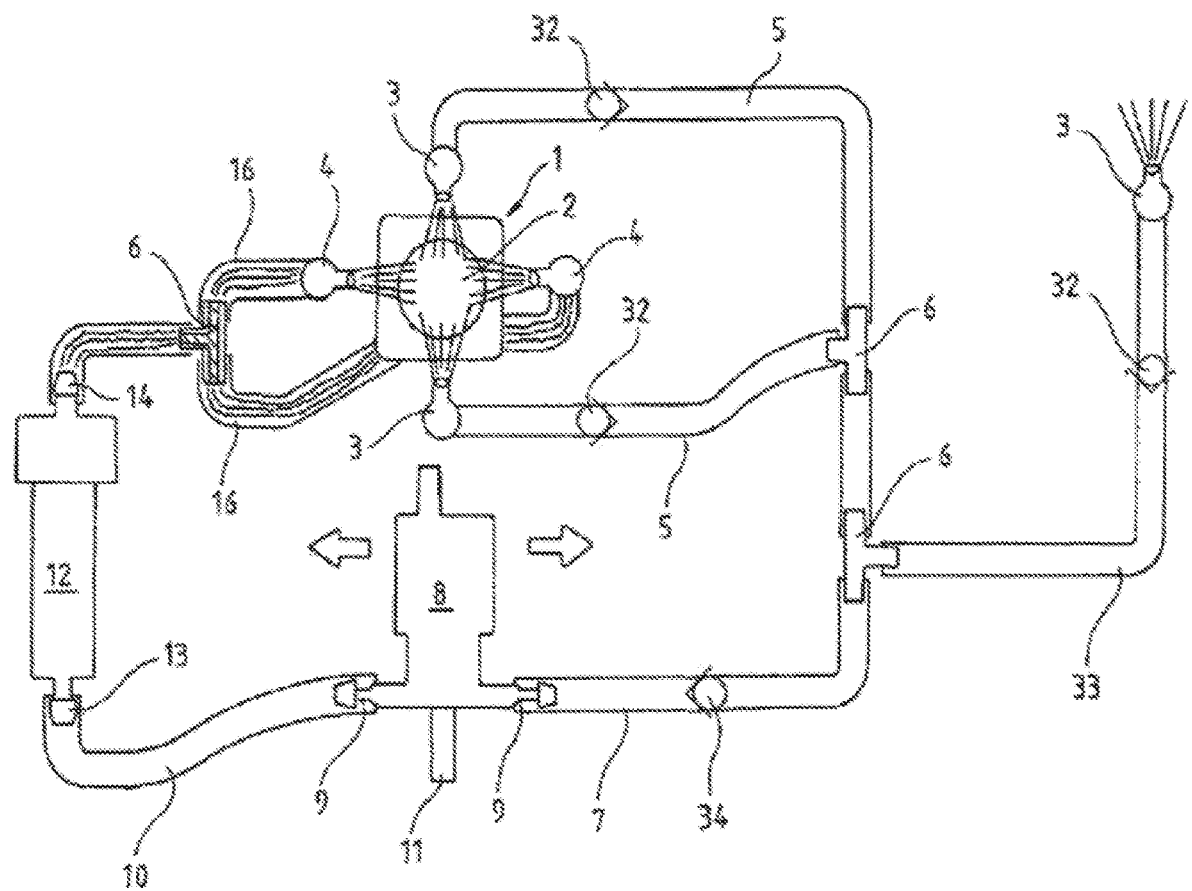
FIG. 7 shows a fifth embodiment of a cleaning fluid system according to the invention using a dual pump system.

FIG. 7 shows a fifth embodiment of the air and fluid cleaning system according to the present invention. The configuration of the fifth embodiment corresponds to the configuration of the first embodiment, i.e., the cleaning fluid pump 8 is designed as a dual pump. As with the fourth embodiment, the system according to FIG. 7 includes a branch fluid line 33 branching off the fluid provided by the cleaning fluid pump 8 to another cleaning fluid nozzle 3 for a vehicle rear wash system, i.e., a system provided at a rear screen/rear window of a car.

| List of reference numerals: | |
|---|---|
| 1 | rear view camera |
| 2 | lens |
| 3 | fluid nozzle |
| 4 | air nozzle |
| 5 | fluid spray hoses |
| 6 | t-connector |
| 7 | primary fluid supply hose |
| 8 | cleaning fluid pump |
| 9 | pressure port |
| 10 | secondary fluid supply hose |
| 11 | suction port |
| 12 | air jet generating means |
| 13 | cleaning fluid port |

| List of reference numerals: | |
|---|---|
| 14 | air port |
| 15 | primary air supply hose |
| 16 | air supply hose |
| 17 | cylinder |
| 18 | piston housing |
| 19 | closure cap |
| 20 | piston |
| 21 | piston seal |
| 22 | platform |
| 23 | coil spring |
| 24 | vent port |
| 25 | cup shaped base of the piston |
| 26 | piston head |
| 27 | air chamber |
| 28 | o-ring-sealing |
| 29 | piston rod |
| 30 | bottom of air chamber |
| 31 | rubber convolute |
| 32 | pressure retention valve |
| 33 | branch fluid line |
| 34 | priming vent valve |
| 35 | check valve |
| 36 | venting hole |
| 37 | peg |
| 38 | groove |
| 39 | o-ring seal |
| 40 | collar |
| 41 | projections |
| 42 | fitting |
| 43 | closure cap |
| 44 | venting hole |
| 45 | groove |

The invention claimed is:

1. Air and fluid cleaning system for propelling a cleaning fluid and air onto a vehicle vision device or onto a vehicle sensor, the cleaning system comprising:
at least one fluid nozzle (3) aiming at the vehicle vision device or at the vehicle sensor,
at least one cleaning fluid pump (8) fluidly connected to a first fluid supply conduit (10) and a second fluid supply conduit (7) and to a cleaning fluid source,
at least one air nozzle (4) aiming at the vehicle vision device or at the vehicle sensor, and
at least one air jet generator (12) fluidly connected to the at least one air nozzle (4), comprising a piston-cylinder arrangement where the piston (20) is reciprocally arranged within the cylinder (17) and where the piston (20) is hydraulically drivable by the pressure of the cleaning fluid,
wherein the air jet generator (12) is hydraulically connected to the first fluid supply conduit (10) the opposite end of which is connected with the cleaning fluid pump (8),
wherein the air jet generator (12) is operable by the fluid pressure provided by the cleaning fluid pump (8) such that, during a first operation time interval of the cleaning system, only cleaning fluid is propelled onto the vehicle vision device or onto the vehicle sensor and such that, during a second operation time interval of the cleaning system, only an air jet burst is propelled onto the vehicle vision device or onto the vehicle sensor, and
wherein the cleaning fluid pump (8) comprises a first pressure port fluidly connected to the air jet generator and a second pressure port fluidly connected to the second fluid supply conduit (7), wherein the pump is configured to allow switching of the sense of rotation so that the flow direction of the cleaning fluid may be changed from a first direction outputting cleaning fluid to the first pressure port to a second direction outputting cleaning fluid to the second pressure port.

2. Air and fluid cleaning system according to claim 1, characterized in that an air blast through an air port (14) of the cylinder (17) is generated by a backwards stroke of the piston (20).

3. Air and fluid cleaning system according to claim 2, characterized in that the piston (20) is biased in a first rest position by a first spring member and may be advanced by the pressure of the cleaning fluid against the biasing force of the spring member into a second loaded position, propelling an air jet towards the at least one air nozzle (4) thereby taking place upon pressure relief of the cleaning fluid which causes a backward stroke of the piston (20).

4. Air and fluid cleaning system according to claim 3, characterized in that the piston (20) is connected to a second spring member boosting the backwards stroke of the piston (20).

5. Air and fluid cleaning system according to claim 4, characterized in that the second spring member is an elastic convolute (31) partly enclosing an air volume.

6. Air and fluid cleaning system according to claim 1, characterized in that the cylinder (18) comprises a cleaning fluid port (13) and an air port (14) which are not in fluid communication with each other.

7. Air and fluid cleaning system according to claim 1, characterized in that the cylinder (17) comprises a vent port (24).

8. Air and fluid cleaning system according to claim 1, characterized in that the cleaning fluid pump (8) is an impeller pump.

9. Method for cleaning a vehicle vision device or a vehicle sensor exposed to ambient utilizing the air and fluid cleaning system according to claim 1, comprising,
aiming the at least one fluid nozzle (3) at the vehicle vision device or at the vehicle sensor and propelling at least one spray or jet of cleaning fluid onto the vehicle vision device or onto the vehicle sensor during a first operation time interval of the air and fluid cleaning system, and
aiming the at least one air nozzle (4) at the vehicle vision device or at the vehicle sensor and propelling at least one air jet burst onto the vehicle vision device or onto the vehicle sensor during a second operation time interval of the cleaning system, thereby operating the air jet generator (12) by the fluid pressure provided by the cleaning fluid pump.

10. Method according to claim 9, characterized in that the first and second time interval are distinct and do not overlap.

11. Method according to claim 9, characterized in that in a sequence of two consecutive operating time intervals during the first operating time interval cleaning fluid is propelled onto the vehicle vision device or onto the vehicle sensor and that during the second operating time interval the at least one air jet burst is propelled onto the vehicle vision device or onto the vehicle sensor thereby blasting away residual cleaning fluid droplets from the vehicle vision device or from the vehicle sensor.

* * * * *